United States Patent
Lande Blau et al.

(10) Patent No.: US 12,476,823 B2
(45) Date of Patent: Nov. 18, 2025

(54) SYSTEM AND METHOD FOR VALIDATING A SIGNATURE OF A VIRTUAL WORKLOAD IMAGE IN RUNTIME

(71) Applicant: Wiz, Inc., New York, NY (US)

(72) Inventors: Amir Lande Blau, Tel Aviv (IL); Roy Reznik, Tel Aviv (IL); Bar Magnezi, Tel Aviv (IL)

(73) Assignee: Wiz, Inc., New York, NY (US)

( * ) Notice: Subject to any disclaimer, the term of this patent is extended or adjusted under 35 U.S.C. 154(b) by 241 days.

(21) Appl. No.: 18/333,097

(22) Filed: Jun. 12, 2023

(65) Prior Publication Data

US 2024/0414005 A1     Dec. 12, 2024

(51) Int. Cl.
*H04L 9/40* (2022.01)
*G06F 8/61* (2018.01)
*H04L 9/32* (2006.01)

(52) U.S. Cl.
CPC .............. *H04L 9/3247* (2013.01); *G06F 8/63* (2013.01)

(58) Field of Classification Search
CPC ................................. H04L 9/3247; G06F 8/63
See application file for complete search history.

(56) References Cited

U.S. PATENT DOCUMENTS

| | | | |
|---|---|---|---|
| 8,291,468 B1 | 10/2012 | Chickering | |
| 9,792,141 B1 | 10/2017 | Sethuramalingam et al. | |
| 10,116,670 B2 | 10/2018 | Muddu et al. | |
| 11,328,065 B1* | 5/2022 | Wall | G06F 21/51 |
| 11,411,958 B2 | 8/2022 | Pularikkal et al. | |
| 11,601,512 B2 | 3/2023 | Xiao et al. | |
| 11,665,001 B1* | 5/2023 | Engelkemier | G06F 21/575 713/2 |
| 11,811,948 B2* | 11/2023 | Burk | H04L 9/083 |
| 2015/0363575 A1* | 12/2015 | Vlot | H04L 9/3247 726/29 |
| 2017/0085532 A1* | 3/2017 | Chan | H04L 9/3247 |
| 2017/0177877 A1* | 6/2017 | Suarez | G06F 21/6218 |
| 2018/0285570 A1* | 10/2018 | Leblanc | G01N 27/44791 |
| 2020/0012818 A1* | 1/2020 | Levin | G06T 7/0002 |
| 2022/0012672 A1* | 1/2022 | Inman | G06Q 10/1053 |
| 2022/0255966 A1* | 8/2022 | Sienicki | H04L 63/123 |
| 2023/0135968 A1* | 5/2023 | Ragusa | H04L 9/3073 726/4 |

* cited by examiner

*Primary Examiner* — Ghodrat Jamshidi
(74) *Attorney, Agent, or Firm* — M&B IP Analysts, LLC

(57) ABSTRACT

In some aspects, a device includes selecting a signed software image for deployment in a computing environment, the software image signed utilizing a private cryptographic key of an asymmetrical cryptography scheme. Also, the device may include accessing a public cryptographic key corresponding to the private cryptographic key. Furthermore, the device may include configuring an admission controller of a software container cluster deployed in the computing environment to verify the signed software image utilizing the public cryptographic key. In addition, the device may include deploying the signed software image in the software container cluster in response to verifying the signed software image. Moreover, the device may include denying deployment of the signed software image, in response to determining that the signed software image is signed with a key which is not the private cryptographic key.

19 Claims, 5 Drawing Sheets

SYSTEM AND METHOD FOR VALIDATING A SIGNATURE OF A VIRTUAL WORKLOAD IMAGE IN RUNTIME

TECHNICAL FIELD

The present disclosure relates generally to validation of image signatures of a virtual workload, and specifically to validating a signature of a virtual workload at runtime.

BACKGROUND

Nearly all activities today rely at some point or another on a computer-based solution. Organizations rely on computing environments for communication, control, storage of information, accounting, customer relations, and so many others.

Different computing environments provide different advantages over one another. Organizations may have further objectives when selecting a computing environment, such as security, privacy, regulations, etc. The offerings today are many and tailored, and can include on-premises environments, networked environments, cloud computing environments, hybrid environments, and the like.

Even within these environments, a cloud computing environment can include multiple differentiated environments, such as a staging environment, a production environment, a testing environment, and the like.

Often, an organization has security policies in place, to determine what principals (e.g., user accounts, service accounts, etc.) can access what types of resources of the computing environment. However, maintaining such policies is complicated, as each of the different environments requires its own solution. This leads to complications in management of cybersecurity policies, which can in turn lead to exposures in an organization's computing infrastructure.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include selecting a signed software image for deployment in a computing environment, the software image signed utilizing a private cryptographic key of an asymmetrical cryptography scheme. Method may also include accessing a public cryptographic key corresponding to the private cryptographic key. Methods may furthermore include configuring an admission controller of a software container cluster deployed in the computing environment to verify the signed software image utilizing the public cryptographic key. Method may in addition include deploying the signed software image in the software container cluster in response to verifying the signed software image. Method may moreover include denying deployment of the signed software image, in response to determining that the signed software image is signed with a key which is not the private cryptographic key. Other embodiments of this aspect include corresponding computer systems, apparatus, and computer programs recorded on one or more computer storage devices, each configured to perform the actions of the methods.

Implementations may include one or more of the following features. Method may include: configuring a webhook of the software container cluster to intercept a request for deploying the signed software image; and directing the request to the admission controller. Method may include: verifying the signed software image by decrypting the signed software image with the public key; and deploying the decrypted signed software image. Method may include: configuring the admission controller to request the public cryptographic key from a target server. Method where the target server is an image repository. Method may include: accessing an image repository where the signed software image is stored. Method may include: initiating a mitigation action in response to detecting that the public key does not decrypt the signed software image. Method where the mitigation action includes any one of: generating a notification, generating a quarantined section in which to store the signed software image, sandboxing a storage of the signed software image, and any combination thereof. Method may include: configuring the admission controller to apply a policy to a software container deployed based on the signed software image. Implementations of the described techniques may include hardware, a method or process, or a computer tangible medium.

In one general aspect, non-transitory computer-readable medium may include one or more instructions that, when executed by one or more processors of a device, cause the device to: select a signed software image for deployment in a computing environment, the software image signed utilizing a private cryptographic key of an asymmetrical cryptography scheme. Medium may furthermore include one or more instructions that, when executed by one or more processors of a device, cause the device to access a public cryptographic key corresponding to the private cryptographic key. Medium may in addition include one or more instructions that, when executed by one or more processors of a device, cause the device to configure an admission controller of a software container cluster deployed in the computing environment to verify the signed software image utilizing the public cryptographic key. Medium may moreover include one or more instructions that, when executed by one or more processors of a device, cause the device to deploy the signed software image in the software container cluster in response to verifying the signed software image. Medium may also include one or more instructions that, when executed by one or more processors of a device, cause the device to deny deployment of the signed software image, in response to determining that the signed software image is signed with a key which is not the private cryptographic key. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: select a signed software image for deployment in a computing environment, the software image signed utilizing a private cryptographic key of an asymmetrical cryptography scheme. System may in addition include instructions that, when executed by the processing circuitry, configure the system to access a public cryptographic key corresponding to the private cryptographic key. System may moreover include instructions that, when executed by the processing circuitry, configure the system to configure an admission controller of a software container cluster deployed in the computing environment to verify the signed software image utilizing the public cryptographic key. System may also include instructions that, when executed by the processing circuitry, configure the system to deploy the signed software image in the software container cluster in response to verifying the signed software image. System may furthermore include instructions that, when executed by the processing circuitry, configure the system to deny deployment of the signed software image, in response to determining that the signed software image is signed with a key which is not the private cryptographic key. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: configure a webhook of the software container cluster to intercept a request for deploying the signed software image; and direct the request to the admission controller. System where the memory contains further instructions which when executed by the processing circuitry further configure the system to: verify the signed software image by decrypting the signed software image with the public key; and deploy the decrypted signed software image. System where the memory contains further instructions which when executed by the processing circuitry further configure the system to: configure the admission controller to request the public cryptographic key from a target server. System where the target server is an image repository. System where the memory contains further instructions which when executed by the processing circuitry further configure the system to: access an image repository where the signed software image is stored. System where the memory contains further instructions which when executed by the processing circuitry further configure the system to: initiate a mitigation action in response to detecting that the public key does not decrypt the signed software image. System where the mitigation action includes any one of: generating a notification, generating a quarantined section in which to store the signed software image, sandboxing a storage of the signed software image, and any combination thereof. System where the memory contains further instructions which when executed by the processing circuitry further configure the system to: configure the admission controller to apply a policy to a software container deployed based on the signed software image. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
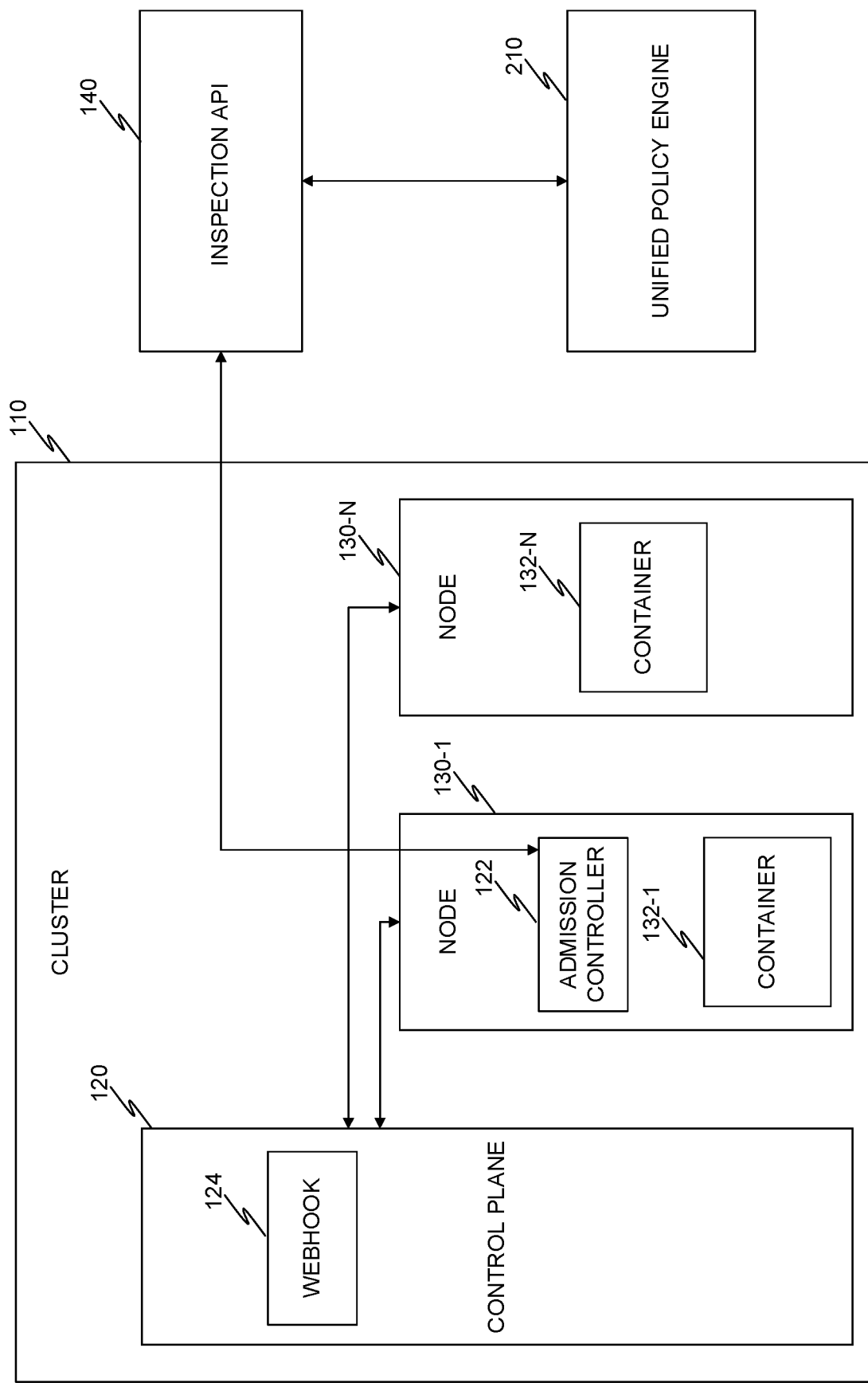
FIG. 1 is an example of a schematic of a software container cluster having an admission controller for policy implementation, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for applying a policy from a unified policy engine in a plurality of computing environments. In an embodiment, a computing environment is a network of computers, a cloud computing environment, a hybrid computing environment, a combination thereof, and the like. Applying a single policy to multiple computing environments is advantageous, as an organization which utilizes multiple computing environments is therefore required to maintain a single point containing policies for the entire organization, regardless of a specific computing environment in use.

This is especially useful, for example, where an organization utilizes multiple computing environments such as a staging environment, a testing environment, an infrastructure as code environment, any combination thereof, and the like. In some embodiments, an organization further utilizes such environments across different cloud computing infrastructures, e.g., Amazon® Web Services (AWS), Google® Cloud Platform (GCP), Microsoft® Azure, and the like. Thus an organization utilizes a first environment (e.g., first staging environment) in a first cloud computing infrastructure (e.g., AWS), and a second environment (e.g., second staging environment) in a second cloud computing infrastructure (e.g., GCP). Utilizing a unified policy engine allows reduced storage, as there is no need to retain multiple copies of policies in different computing environments, and reduces the need to ascertain that all computing environments of an organization utilize the same policies across all computing environments, according to an embodiment.

For example, the first environment and the second environment would each require a policy engine, each policy engine having copies of policies stored on the other. Therefore, where a change, such as an exception, is introduced to a policy in the first environment, a corresponding change would have to be introduced to a corresponding policy in the second environment.

In this regard, it is recognized that applying a policy and changing policies are activities that can be performed by a human. However, cybersecurity policies, in order to be effective, need to be applied in a manner which is consistent, objective, and equal across multiple computing environments, and in a timely manner as any time window where policies are not aligned between computing environments potentially results in an exposure of that environment.

A human, therefore, is incapable of applying policies, and applying changes to policies, across multiple computing environments, or indeed any computing environments, in a manner which is timely, consistent, objective, and equal. This is because the human mind inherently applies conditions subjectively, whereas the disclosed system utilizes an objective admission controller.

According to an embodiment, a software container cluster includes an admission controller which is configured to receive a policy from a unified policy engine, and apply the policy to all containers, nodes, pods, combinations thereof, and the like, deployed in a software container cluster.

FIG. 1 is an example of a schematic of a software container cluster having an admission controller for policy implementation, utilized to describe an embodiment. In an embodiment, a container cluster 110 is deployed on a computer system, such as described in more detail in FIG. 4 below.

In some embodiments, a software container cluster 110 is implemented utilizing a Kubernetes® platform, a Docker® Engine, and the like. In certain embodiments, a software container cluster 110 is configured to deploy a plurality of software containers. In an embodiment, a software container is a containerized software application.

In certain embodiments, a container cluster 110 includes a control plane 120 configured to communicate with an inspection application programming interface (API) 140, and a plurality of nodes 130-1 through 130-N, where 'N' is an integer having a value of '2' or greater, individually referred to as node 130 and collectively referred to as nodes 130.

In an embodiment, the control plane 120 is implemented on a single machine in the cluster. In some embodiments, the machine on which the control plane 120 is implemented only executes components of the control plane 120. For example, in an embodiment, the machine does not include a container based on a user-generated image, base image, and the like.

For example, in some embodiments, a Kubernetes container cluster control plane 120 includes components such as an API server, a key value store, a scheduler, a controller, and the like. In an embodiment, the API server is implemented as a kube-api server, which is configured to expose the Kubernetes API to external resources. In certain embodiments, the key value store is configured to store key values, cluster data, and the like.

In some embodiments, the controller includes a node controller, a job controller, a service account controller, and the like. In certain embodiments, the control plane 120 includes a webhook 124. In an embodiment, the webhook 124 is a validating webhook, a mutating webhook, and the like. In an embodiment, a webhook 124 is configured to detect a request to an API, to another node in the cluster, and the like. In certain embodiments, the webhook 124 is further configured to send the request to an admission controller 122. In an embodiment, the cluster 110 includes a plurality of nodes 130-1 through 130-N.

In certain embodiments, each node 130 includes a container 132. In some embodiments, the container 132 includes a containerized software application. In certain embodiments, a node 130 includes a plurality of containers, an agent, a network proxy, a combination thereof, and the like. In an embodiment, a containerized software application includes a software, dependencies of the software, a combination thereof, and the like.

In certain embodiments, an inspection API 140 is configured to expose resources, communication, and the like, with a cloud computing environment. For example, in an embodiment, a cloud computing environment is a virtual private cloud (VPC), a virtual network (VNet), and the like, deployed on a cloud computing infrastructure. In an embodiment, a cloud computing infrastructure is Amazon® Web Services (AWS), Google® Cloud Platform (GCP), Microsoft® Azure, and the like. In certain embodiments, the control plane 120 of the cluster 110 is configured to communicate through the inspection API 140.

In some embodiments, an admission controller 122 is deployed on a node 130-1. In an embodiment, an admission controller 122 is configured to receive intercepted requests to the API server of the control plane 120. For example, in an embodiment, a software container 132-N is configured to communicate through a node 130-N to an API server of the control plane 120, which in turn is configured to communicate with the inspection API 140.

In certain embodiments, the admission controller 122 is implemented as computer software deployed on a node of the cluster 110. In some embodiments, the admission controller 122 is configured to communicate with a unified policy engine 210, for example through the inspection API 140.

In some embodiments, the admission controller 122 is configured to request a policy from the unified policy engine 120. In an embodiment, the admission controller 122 is configured to apply the received policy on a request intercepted from a container 132-1 of a node 130-1.

In some embodiments, a policy includes a conditional rule. For example, in an embodiment, a policy includes a conditional rule, utilized to check if a network communication is directed to an IP address which is on a list of banned IP addresses. In an embodiment, a request is generated by a software container 132-N to send a network message, the request including a destination address (e.g., an IP address). In an embodiment, the request is delivered from the node 130-N to the control plane 120, where the request is intercepted by the webhook 124. The request is sent to the admission controller 122, which is configured to apply a policy on the request.

In some embodiments, the admission controller 122 is configured to apply a policy to the request. For example, in an embodiment, the admission controller 122 is configured to apply a conditional rule such that if a communication is directed to an IP address stored in a list of blocked IP addresses, the communication is denied, and the request is not passed to the inspection API 140. In certain embodiments, the admission controller 122 is configured to apply a conditional rule such that if a communication is not directed to an IP address stored in a list of blocked IP addresses, the communication is allowed to pass through, and is forwarded, for example, to the inspection API 140.

In an embodiment, the admission controller 122 is configured to apply a conditional rule such that if a communication is directed to an IP address stored in a list of allowed IP addresses, the communication is allowed, and the request is passed to the inspection API 140. In some embodiments, the admission controller 122 is configured to apply a conditional rule such that if a communication is not directed to an IP address stored in a list of allowed IP addresses, the communication is denied, and the request is not passed to the inspection API 140.

Figure 2:
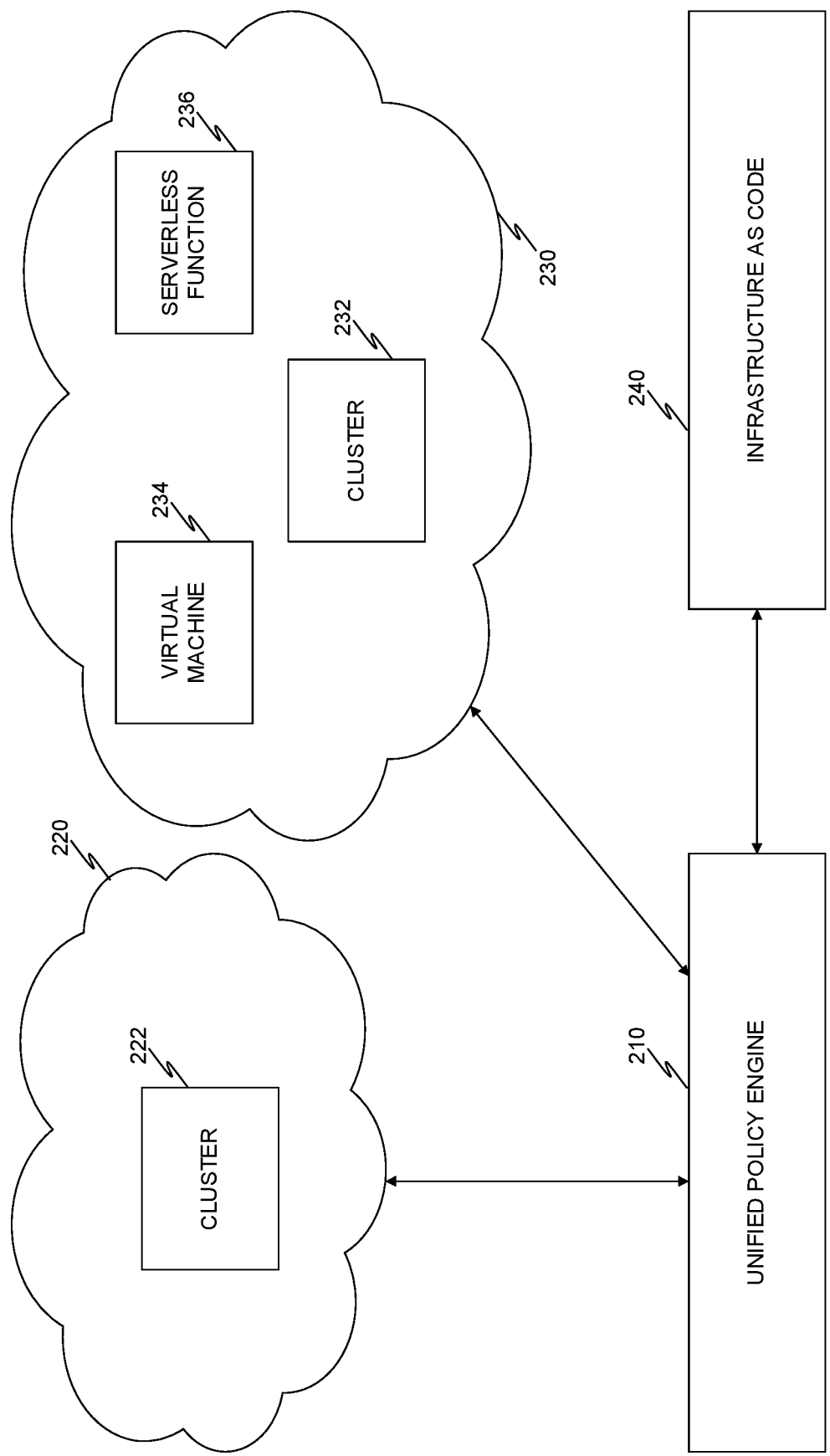
FIG. 2 is an example of a network diagram with multiple computing environments utilizing a unified policy engine, implemented according to an embodiment.

FIG. 2 is an example of a network diagram with multiple computing environments utilizing a unified policy engine, implemented according to an embodiment. In an embodiment, a unified policy engine 210 includes a rule, a policy, a combination thereof, and the like. In some embodiments, a rule includes a condition, for example such that when the condition is met an action is performed, when the condition is met an action is refrained from being performed, when a condition is not met an action is performed, when a condition is not met an action is refrained from being performed, combinations thereof, and the like.

In some embodiments, a unified policy engine 210 supplies rules, policies, and the like, to various computing environments. For example, in an embodiment, the unified policy engine supplies a rule to a first cloud computing environment 220, a second cloud computing environment 230, and an infrastructure as code (IaC) environment 240.

In an embodiment, a cloud computing environment is a virtual private cloud (VPC), a virtual network (VNET), and the like, implemented on a cloud computing infrastructure. According to an embodiment, a cloud computing infrastructure is, for example, Amazon® Web Services (AWS), Microsoft® Azure, Google® Cloud Platform (GCP), and the like.

In certain embodiments, an IaC environment 240 is utilized, for example, with Terraform®, Ansible®, Chef®, Puppet®, and the like.

In certain embodiments, security policies are maintained for different compute environments, for example in order to secure certain digital assets, prevent unwanted or unintended access, and the like. In some embodiments, for example where continuous integration and continuous deployment (CI/CD) is implemented, multiple compute environments are related. For example, according to an embodiment, declaratory code in an IaC environment 240 is utilized to deploy a software container cluster 222 in a staging environment 220.

In an embodiment, a staging environment is a cloud computing environment in which resources, principals, and the like, are deployed prior to being deployed in a production environment, such as production environment 230. This is beneficial as it allows to test and benchmark a resource, such as the container cluster 222 prior to deploying a counterpart to the container cluster 222 in the production environment 230. For example, in an embodiment, the counterpart to the container cluster 222 deployed in the staging environment 220 is the software container cluster 232 deployed in the production environment 230.

According to an embodiment, once a resource, such as the container cluster 222 passes a benchmark, test, and the like, code utilized to deploy the container cluster 222 in the staging environment 220 can be utilized to deploy the container luster 232 in the production environment 230. In some embodiments, it is beneficial to take action based on a code object, a resource deployed in a staging environment based on the code object, and a corresponding resource deployed in the production environment, wherein the action applies to each of the code object and two resources.

For example, in some embodiments, it is useful to employ a policy on a code object, on a resource deployed in a staging environment 220, and a corresponding resource deployed in a production environment 230, as all these correspond to each other. In certain embodiments, a policy is enacted based on observation of a resource, such as the container cluster 222, in a staging environment.

Utilizing a unified policy engine 210 allows to store a single policy utilized by each related computing environment. This is preferable to storing a corresponding policy in each computing environment, especially when these computing environments are related to each other. In an embodiment, utilizing a single unified policy engine 210 also reduces storage space required to store redundant similar policies, as it eliminates the need to store a corresponding policy in each different (yet related) computing environment.

Furthermore, configuring a software container cluster to deploy an admission controller which is configured to utilize policies from the unified policy engine 210 provides a level of assurance that a policy is enacted on each container in the cluster, and across multiple clusters in any computing environment. A single policy is therefore applied equally, objectively, and consistently. While it is recognized, for example, that a human can apply a condition to a resource, it is also recognized that a human is incapable of applying a condition (e.g., a policy) in a manner that is equal and objective in a consistent manner across multiple computing environments, and can certainly not do so within a timeframe that would make application of such a policy useful.

Figure 3:
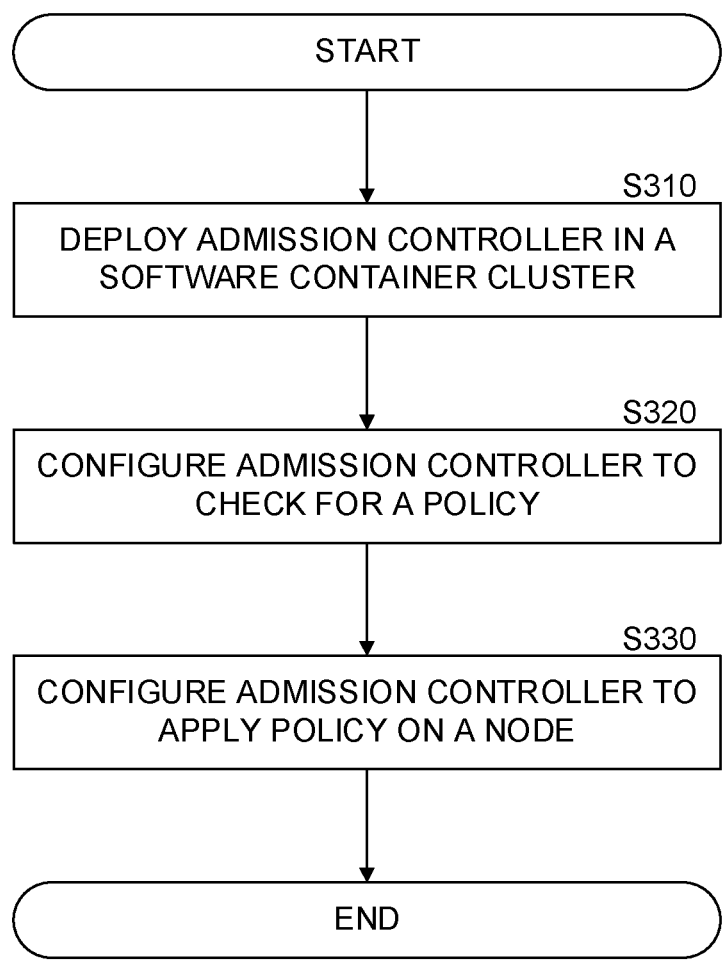
FIG. 3 is an example flowchart of a method for deploying a policy-enforcing admission controller for a software container, implemented in accordance with an embodiment.

FIG. 3 is an example flowchart of a method for deploying a policy-enforcing admission controller for a software container, implemented in accordance with an embodiment.

At S310, an admission controller is deployed. In some embodiments, a plurality of admission controllers are deployed. In an embodiment, the admission controller is deployed in a control plane of a software container cluster. In some embodiments, a software container cluster is implemented on a Kubernetes® platform.

In certain embodiments, the admission controller is configured to intercept API requests between a node in the container cluster and an inspection API of the container cluster. In an embodiment, the admission controller is configured as a mutating admission controller, a validating admission controller, a combination thereof, and the like. In certain embodiments, a plurality of admission controllers, including a mutating admission controller and a validating admission controller, are deployed.

In some embodiments, a mutating admission controller is configured to modify a request which is received by the admission controller. For example, in an embodiment, the admission controller is configured to modify a request based on a policy received from a unified policy engine.

In certain embodiments, a validating admission controller is configured to validate a request without changing the request itself. In certain embodiments, an admission controller is configured to validate a request which was modified by a mutating admission controller.

At S320, a check is performed for a policy. In an embodiment, an admission controller is configured to periodically check, for example by sending a request to a unified policy engine, to receive a new policy. In certain embodiments, the admission controller is configured to send to the unified policy engine a policy version number. In some embodiments, the unified policy engine is configured to compare a received policy version to a stored policy version, and send an admission controller the stored policy version in response to determining that the received version is older than the stored version.

At S330, the policy is applied. In an embodiment, the admission controller is configured to apply the policy, for example, on a container deployed in a node of the cluster where the admission controller is deployed. In certain embodiments, a plurality of policies are applied.

In some embodiments, an admission controller is configured to merge a plurality of policies, such as a first policy and a second policy, into a single policy, and apply the single policy to each container, pod, and the like, in the cluster. In certain embodiments, a policy is merged by extracting a conditional rule from a first policy, extracting a conditional rule from a second policy, and generating a new conditional rule, for example by adding a Boolean "AND" operator between the conditional rule of the first policy and the conditional rule of the second policy.

In some embodiments, a policy is applied each occurrence where a node, a pod, a container, and the like, access the control plane of the cluster. For example, in an embodiment, a policy is applied in response to detecting an instruction to deploy a node, a pod, a container, a combination thereof, and the like, in the cluster. In some embodiments, a policy is applied on a request originating from a node, a pod, a container, a combination thereof, and the like, such as a request to communicate with an IP address through an inspection API.

Figure 4:
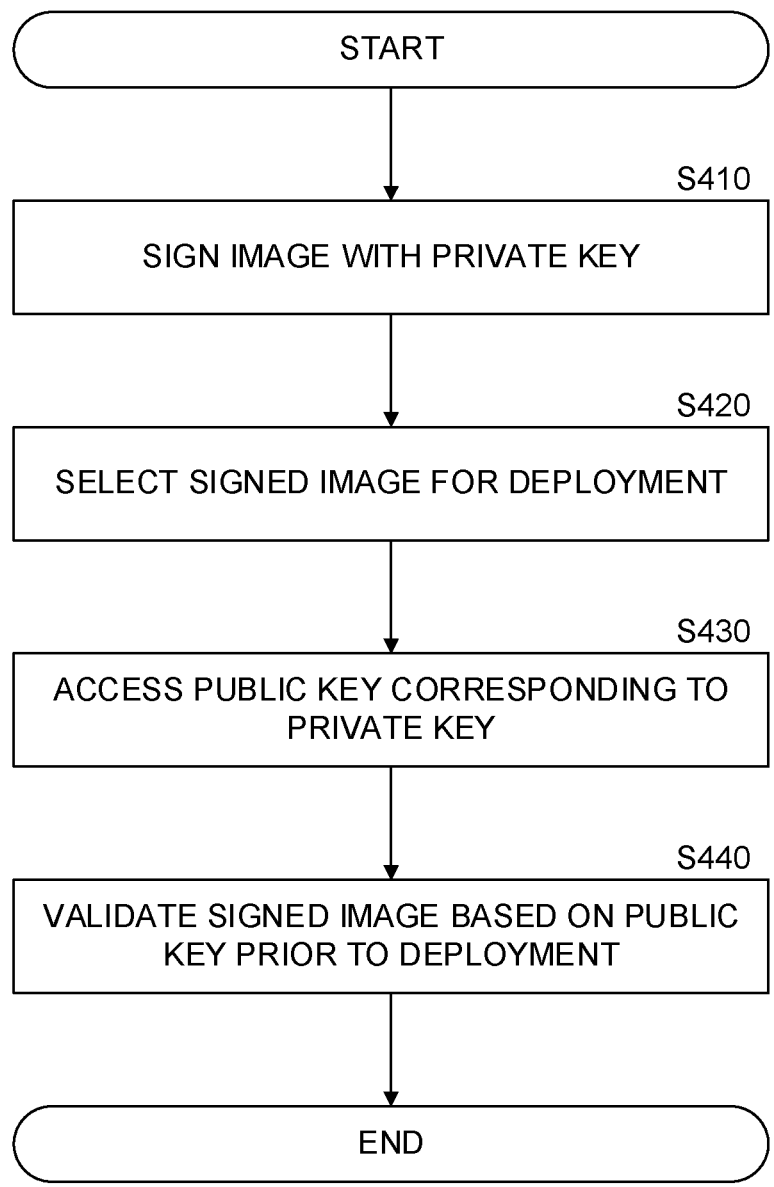
FIG. 4 is a flowchart of a method for validating a signed virtual workload, implemented according to an embodiment.

FIG. 4 is a flowchart of a method for validating a signed virtual workload, implemented according to an embodiment. In an embodiment, a signed virtual workload is a workload which is deployed based on a signed image. A signed image is generated by applying an asymmetric cryptographic key (e.g., a private key) to a software image, from which, for example, a software container can be deployed in a software container cluster.

According to an embodiment, validating an image prior to deployment is beneficial, as this ensures that only images which are verified images (i.e., images whose cryptographic signatures are verified) are utilized to deploy software containers. This hinders a malicious actor from providing a software image to be deployed, utilizing, for example, a key, certificate, and the like, which cannot be verified. Utilizing an asymmetric cryptographic key allows a software developer to sign the software container using a private key, while providing a public key to any party that wishes to validate the signature of the private key.

In this regard, it is recognized that a human can validate authenticity of a signature. However, a human brain is not capable of validating a signature of a software image utilizing an asymmetric cryptographic key. Furthermore, even if a more simple version of an asymmetric cryptographic key scheme is used, a human could still not perform such a validation in a time frame which is meaningful in a computing environment, and could certainly not perform this in a manner which is reliable, consistent, and equal, across multiple cloud platforms, multiple software container clusters, and a combination thereof.

At S410, a software image is signed with a cryptographic key. In an embodiment, the software image is a software image for a software container, a serverless function, a virtual machine, a combination thereof, and the like. In some embodiments, the cryptographic key is a private key of an asymmetric cryptographic scheme. In certain embodiments, the private key is paired with a public key, such that the public key is utilized to decrypt information encrypted with the private key. Successful decryption of the information constitutes a validation, verification, and the like, according to an embodiment.

In some embodiments, a software image is signed and stored in a repository of software images. In an embodiment, a software image includes an identifier, such as a unique identifier. In some embodiments, the software image, software image identifier, a combination thereof, and the like, are stored together with a public key corresponding to the private key which was utilized in encrypting the software image.

At S420, the software image is selected for deployment. In an embodiment, selecting a software image includes accessing a repository where a plurality of software images are stored, detecting a software image corresponding to an identifier, and accessing a storage of the repository where the software image corresponding to the identifier is stored.

In certain embodiments, the software image is selected by a service of a control plane of a software container cluster. In some embodiments, a plurality of software images are selected. In an embodiment, selecting a software image includes selecting a version identifier (e.g., version name, version number, and the like) where a plurality of versions exist for a software image having a common identifier.

In an embodiment, the software image is encrypted with a private key, and includes an identifier of a public key, a public key, a combination thereof, and the like, with which the software image can be validated, verified, a combination thereof, and the like.

At S430, a public key is accessed. In an embodiment, the public key is an asymmetric cryptographic key corresponding to a private key. In certain embodiments, the private key corresponding to the public key is utilized to sign (e.g., encrypt) the software image.

In some embodiments, the public key is accessed by retrieving a copy of the public key stored in the repository where the software image is stored. In certain embodiments, the public key is accessed by a policy engine, which provides the public key to an admission controller deployed in a control plane of a software container cluster. In an embodiment, the policy engine stores a copy of the public key which is retrieved from a repository where the signed software image is stored.

At S440, the signed software image is validated. In an embodiment, the signed software is validated, verified, a combination thereof, and the like, prior to deployment. In certain embodiments, an admission controller is configured to intercept a request to deploy a signed software image, and performs validation of the signed software image. In some embodiments, the admission controller is configured to access the policy engine to retrieve the public key which is utilized to validate, verify, and the like, the signed software image.

In an embodiment, the admission controller is configured to deploy a signed software image as a software container in a software container cluster, in response to determining that the image includes a valid signature. In some embodiments, the admission controller is configured to deny deployment of the software image in response to detecting that the signed software image includes a signature which is not valid, does not include a signature, and the like.

Figure 5:
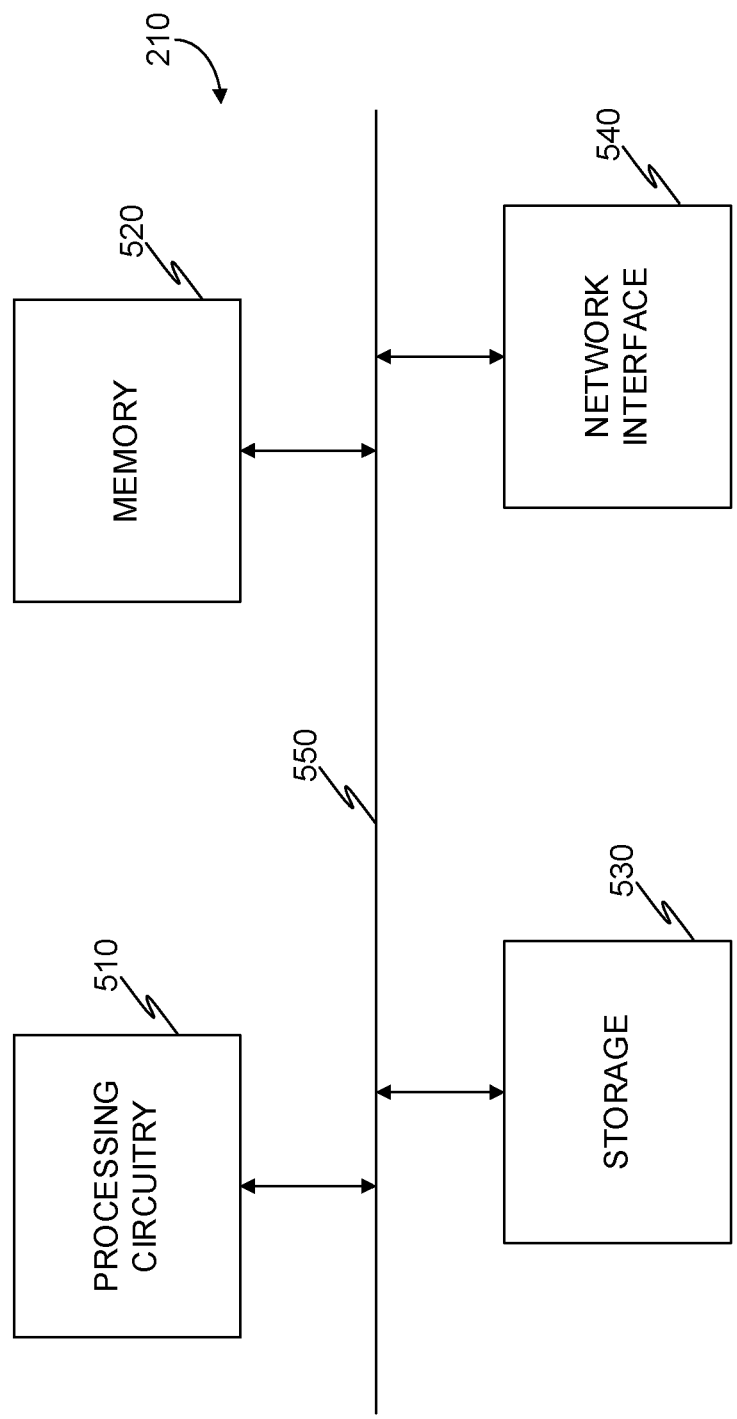
FIG. 5 is an example schematic diagram of a unified policy engine according to an embodiment.

FIG. 5 is an example schematic diagram of a unified policy engine 210 according to an embodiment. The unified policy engine 210 includes a processing circuitry 510 coupled to a memory 520, a storage 530, and a network interface 540. In an embodiment, the components of the unified policy engine 210 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the unified policy engine 210 with communication with, for example, the cloud API 140, the software container cluster 110, and the like.

It should be understood that the embodiments described herein are not limited to the specific architecture illustrated in FIG. 5, and other architectures may be equally used without departing from the scope of the disclosed embodiments.

Furthermore, in certain embodiments the software container cluster 110 may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for deploying signed software images in a computing environment, comprising:
   selecting a signed software image for deployment in a computing environment, the software image signed utilizing a private cryptographic key of an asymmetrical cryptography scheme;
   accessing a public cryptographic key corresponding to the private cryptographic key;
   configuring an admission controller of a software container cluster deployed in the computing environment to verify the signed software image utilizing the public cryptographic key;
   deploying the signed software image in the software container cluster in response to verifying the signed software image; and
   denying deployment of the signed software image, in response to determining that the signed software image is signed with a key which is not the private cryptographic key.

2. The method of claim 1, further comprising:
   configuring a webhook of the software container cluster to intercept a request for deploying the signed software image; and
   directing the request to the admission controller.

3. The method of claim 1, further comprising:
   verifying the signed software image by decrypting the signed software image with the public key; and
   deploying the decrypted signed software image.

4. The method of claim 1, further comprising:
configuring the admission controller to request the public cryptographic key from a target server.

5. The method of claim 4, wherein the target server is an image repository.

6. The method of claim 5, further comprising:
accessing an image repository where the signed software image is stored.

7. The method of claim 1, further comprising:
initiating a mitigation action in response to detecting that the public key does not decrypt the signed software image.

8. The method of claim 7, wherein the mitigation action includes any one of: generating a notification, generating a quarantined section in which to store the signed software image, sandboxing a storage of the signed software image, and any combination thereof.

9. The method of claim 1, further comprising:
configuring the admission controller to apply a policy to a software container deployed based on the signed software image.

10. A non-transitory computer-readable medium storing a set of instructions for deploying signed software images in a computing environment, the set of instructions comprising:
one or more instructions that, when executed by one or more processors of a device, cause the device to:
select a signed software image for deployment in a computing environment, the software image signed utilizing a private cryptographic key of an asymmetrical cryptography scheme;
access a public cryptographic key corresponding to the private cryptographic key;
configure an admission controller of a software container cluster deployed in the computing environment to verify the signed software image utilizing the public cryptographic key;
deploy the signed software image in the software container cluster in response to verifying the signed software image; and
deny deployment of the signed software image, in response to determining that the signed software image is signed with a key which is not the private cryptographic key.

11. A system for deploying signed software images in a computing environment comprising:
a processing circuitry; and
a memory, the memory containing instructions that, when executed by the processing circuitry, configure the system to:
select a signed software image for deployment in a computing environment, the software image signed utilizing a private cryptographic key of an asymmetrical cryptography scheme;
access a public cryptographic key corresponding to the private cryptographic key;
configure an admission controller of a software container cluster deployed in the computing environment to verify the signed software image utilizing the public cryptographic key;
deploy the signed software image in the software container cluster in response to verifying the signed software image; and
deny deployment of the signed software image, in response to determining that the signed software image is signed with a key which is not the private cryptographic key.

12. The system of claim 11, wherein the memory contains further instructions which when executed by the processing circuitry further configure the system to:
configure a webhook of the software container cluster to intercept a request for deploying the signed software image; and
direct the request to the admission controller.

13. The system of claim 11, wherein the memory contains further instructions which when executed by the processing circuitry further configure the system to:
verify the signed software image by decrypting the signed software image with the public key; and
deploy the decrypted signed software image.

14. The system of claim 11, wherein the memory contains further instructions which when executed by the processing circuitry further configure the system to:
configure the admission controller to request the public cryptographic key from a target server.

15. The system of claim 14, wherein the target server is an image repository.

16. The system of claim 15, wherein the memory contains further instructions which when executed by the processing circuitry further configure the system to:
access an image repository where the signed software image is stored.

17. The system of claim 11, wherein the memory contains further instructions which when executed by the processing circuitry further configure the system to:
initiate a mitigation action in response to detecting that the public key does not decrypt the signed software image.

18. The system of claim 17, wherein the mitigation action includes any one of:
generating a notification, generating a quarantined section in which to store the signed software image, sandboxing a storage of the signed software image, and any combination thereof.

19. The system of claim 11, wherein the memory contains further instructions which when executed by the processing circuitry further configure the system to:
configure the admission controller to apply a policy to a software container deployed based on the signed software image.

* * * * *